United States Patent [19]

Moen

[11] 4,395,018

[45] Jul. 26, 1983

[54] VALVE MEMBER WITH FIXED SEAL SHUTOFF

[75] Inventor: Alfred M. Moen, Grafton, Ohio

[73] Assignee: Stanadyne, Inc., Windsor, Conn.

[21] Appl. No.: 348,997

[22] Filed: Feb. 16, 1982

Related U.S. Application Data

[63] Continuation of Ser. No. 173,490, Jul. 30, 1980, abandoned, which is a continuation-in-part of Ser. No. 925,538, Jul. 19, 1978, abandoned, which is a continuation-in-part of Ser. No. 871,178, Jan. 23, 1978, abandoned.

[51] Int. Cl.³ .................................................. F16K 5/04
[52] U.S. Cl. ............................ 251/310; 251/DIG. 1
[58] Field of Search ............... 251/325, 310, 317, 209; 137/625.17

[56] References Cited

U.S. PATENT DOCUMENTS

| 3,324,879 | 6/1967 | Bucknell | 251/325 |
| 3,426,795 | 2/1969 | Muller | 251/310 |
| 3,730,222 | 5/1973 | Moen | 137/625.17 |
| 4,010,930 | 3/1977 | Sands | 251/209 |
| 4,022,426 | 5/1977 | Read | 251/317 |

Primary Examiner—Martin P. Schwadron
Assistant Examiner—J. R. Shay
Attorney, Agent, or Firm—Kinzer, Plyer, Dorn and McEachran

[57] ABSTRACT

A fluid valve includes a sleeve having inlet and outlet ports and a stem movable within the sleeve. The stem has inlet and outlet port means with the outlet port means being movable into register with the sleeve outlet port. A fixed seal member is positioned on the sleeve, out of the path of flow through the stem to the sleeve, with the stem outlet port being closed by the seal member when the valve is in a closed position.

29 Claims, 21 Drawing Figures

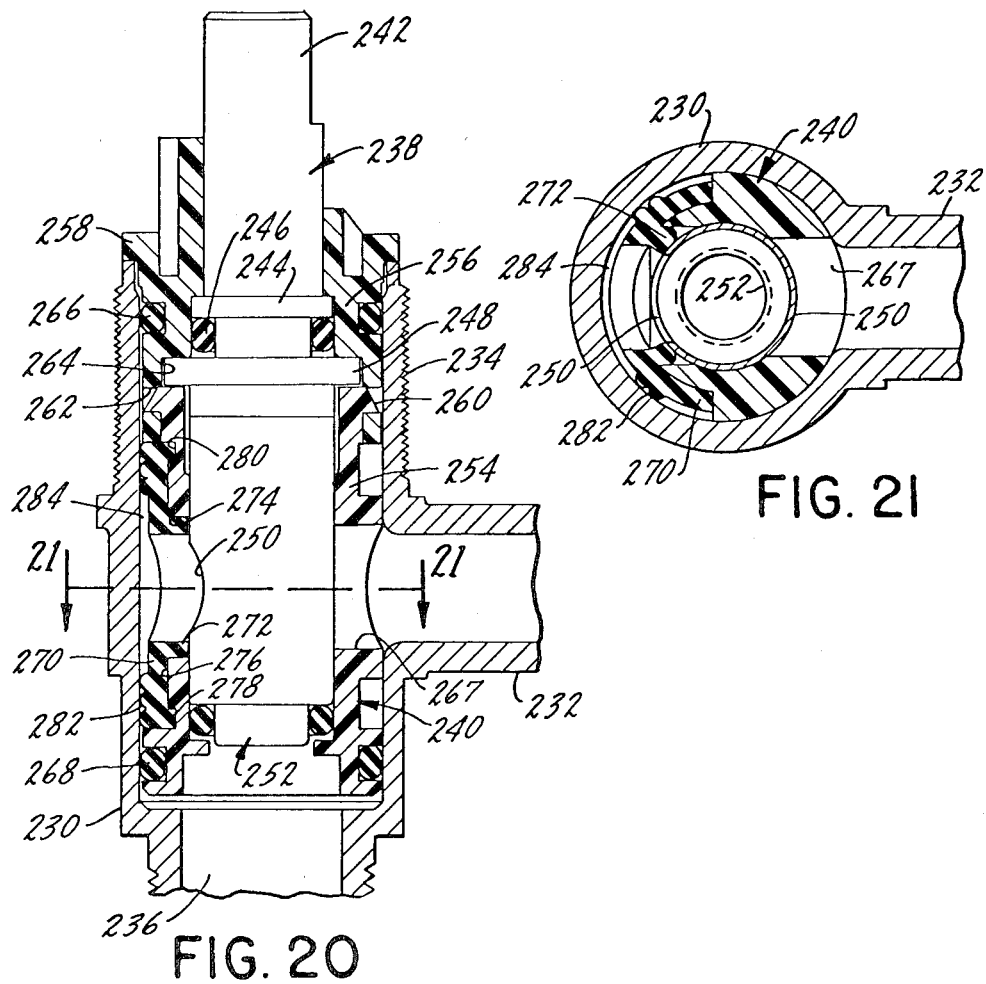

VALVE MEMBER WITH FIXED SEAL SHUTOFF

This is a continuation, of application Ser. No. 173,490, filed July 30, 1980, now abandoned, which is a continuation-in-part of my copending application Ser. No. 925,538, filed July 19, 1978, now abandoned, which in turn was a continuation-in-part of application Ser. No. 871,178, filed Jan. 23, 1978, now abandoned.

SUMMARY OF THE INVENTION

The present invention relates to fluid valves and particularly to a valve of the type usable in a two-handle lavatory or kitchen faucet.

A primary purpose of the invention is a simply constructed reliably operable fluid valve of the type described.

Another purpose is a fluid valve utilizing a stationary seal member having an annulus positioned on an axis at 90 degrees to the axis of a movable stem to provide valve closure.

Another purpose is a valve of the type described in which the stem includes a steel piston movable into contact with a stationary and valve closing seal member.

Another purpose is a valve structure including a sleeve, a stem rotatable within the sleeve, a fixed annular seal member carried by the sleeve with the stem outlet port being movable toward and away from register with the seal, and a seal support holding the seal in position on the sleeve.

Another purpose is a valve of the type described which provides modulated water flow.

Another purpose is a valve structure of the type described utilizing an annular seal ring diagonally disposed relative to the axis of the stem and sleeve and positioned about the exterior of the stem to provide a valve closure.

Another purpose is a valve structure utilizing spaced stationary annular seal rings positioned at diammetrically opposed points on a sleeve and having the sleeve outlet midway between such fixed seal members, said valve including a stem movable between open and closed positions in said sleeve.

Another purpose is a valve structure using a stationary seal member fixed on the sleeve to provide valve closure, which seal member is positioned away from the path of fluid flow through the valve.

Another purpose is a valve structure using a fixed seal member positioned on the sleeve for valve closure, which fixed seal member includes a body portion attached to the sleeve exterior and an annular portion extending through the sleeve and into sealing contact with the interior stem.

Another purpose is a valve of the type described having identical seal rings used at different places within the valve with the seal rings having different wear areas whereby upon excessive wear of one seal ring it may be interchanged with another.

Another purpose is a fluid valve of the type described having a sleeve structure or sleeve means which includes a seal support and a sleeve, with the seal support being positioned either inside of or outside of the sleeve.

Other purposes will appear in the ensuing specification, drawings and claims.

BRIEF DESCRIPTION OF THE DRAWINGS

The invention is illustrated diagrammatically in the following drawings wherein:

FIG. 20 is a partial vertical section showing a further modified form of valve construction, and FIG. 21 is a section along plane 21—21 of FIG. 20.

DESCRIPTION OF THE PREFERRED EMBODIMENT

Figure 1:
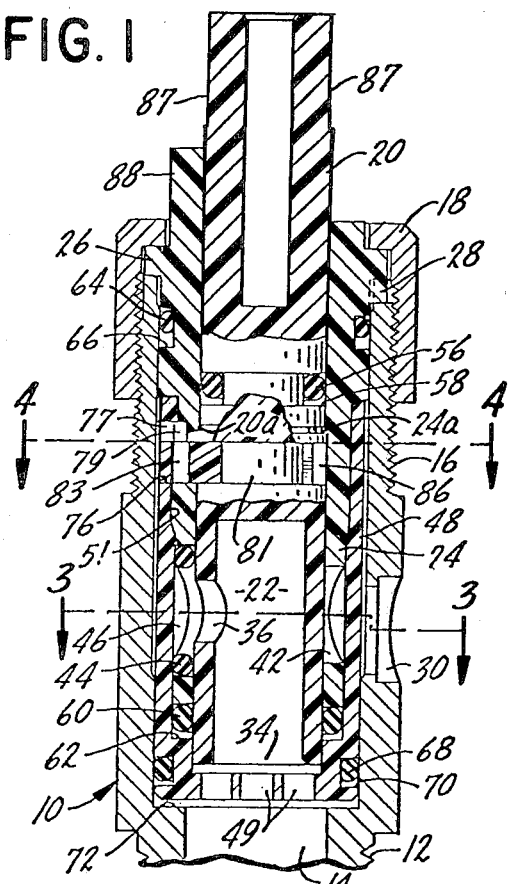
FIG. 1 is an axial section through a valve of the type described.

The valve structure of the present invention is usable in kitchen, lavatory and shower-tub faucet combinations in which there are separate valves for controlling the flow of hot and cold water. The valve should not be limited to such applications, but it has been found to be particularly suitable for such uses. The valve is simple in construction and valve shutoff is accomplished by use of an O-ring type seal or seal portion fixed in position on a sleeve. In one embodiment a stem rotates about an axis 90 degrees to the axis of the seal ring with the stem outlet port being moved toward and away from register with and thus closure by the stem seal. In a second embodiment there are a pair of closing seal rings and a pair of stem outlets with the sleeve discharge being positioned intermediate the closing seal rings. In another form a diagonally disposed seal ring is positioned about the stem to provide valve closure. In yet a further form, the seal ring is an integral annular part of a seal member attached to the sleeve exterior. In FIG. 1, a valve housing is indicated generally at 10 and has a lower threaded section 12 for use in attaching the housing to a supporting plumbing structure. An inlet passage 14 leads into the housing interior to provide water for the valve structure positioned therein. The upper end of housing 10 is threaded, as at 16, to mount a collar 18 which is used to hold the valve within the housing.

The valve structure includes a valve stem 20 having a lower downwardly opening chamber 22. Stem 20 is positioned within a sleeve 24 which in turn is mounted within housing 10. The sleeve may have an outwardly-extending annular shoulder 26 which seats upon the upper end of housing 10 with collar 18 overlying shoulder 26 to hold the sleeve in position within the housing. Collar 26 may have a downwardly-extending projection 28 which fits within a mating notch in housing 10 to properly align the sleeve and housing to insure passage of water through the valve and then outwardly through housing discharge port 30.

Sleeve 24 is open at the bottom. Stem 20 similarly is open at the bottom or interior end 34 to provide access to internal chamber 22. Stem 20 has a radially directed discharge port 36 which is movable into register with sleeve discharge port means 38 consisting of a circumferentially extending slot 40 and a generally circular discharge port 42. The combination of slot 40 and port 42 provides a modulated water discharge.

Figure 3:
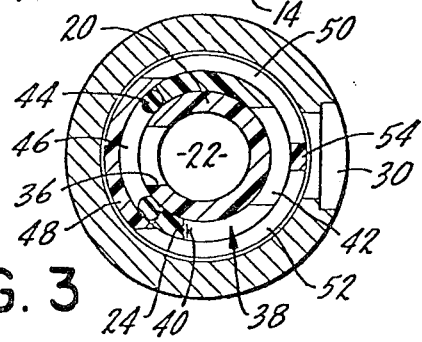
FIG. 3 is a section along plane 3—3 of FIG. 1.
Figure 2:
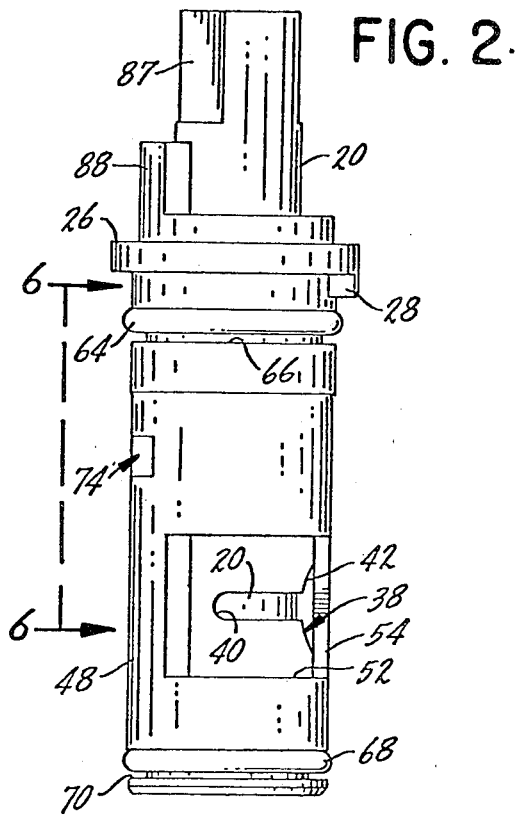
FIG. 2 is a side view of the valve.
Figure 5:
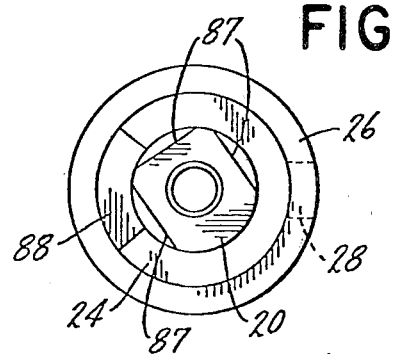
FIG. 5 is a top view of the valve.
Figure 6:
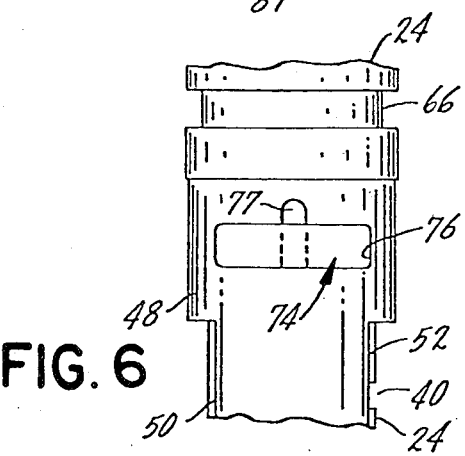
FIG. 6 is a side view along plane 6—6 of FIG. 2.

An annular seal ring 44 is positioned within an aperture 46 in the sleeve and is fixed in position relative to both the stem and the sleeve. A cylindrical seal support 48 extends about the sleeve and is attached to the sleeve by the thrust key to be described hereinafter. Seal support 48 has enlarged oppositely positioned openings 50 and 52 clearly shown in FIGS. 2 and 3 and separated by element 54. Openings 50 and 52 provide a path for water from the sleeve and stem to flow to housing discharge port 20. The bottom of seal support 48 has openings 49 to provide communication between the sleeve and stem and passage 14. Openings 49 also function as a screen to prevent large objects from passing into the valve structure.

Stem 20 is in sealing relationship with sleeve 24 through an upper O-ring seal 56 positioned within an annular groove 58 on the stem and a lower O-ring seal 60 positioned between a shoulder 62 on seal support 48 and the bottom of sleeve 24. The exterior of sleeve 24 is sealed to housing 10 through an upper seal 64 positioned within a sleeve groove 66 and a lower seal 68 positioned within a groove 70 on seal support 48. Note particularly in FIG. 1 that the bottom of the seal support, which may be considered a part of the sleeve structure, forms the inlet for the valve and is closely adjacent a shoulder 72 formed near the lower end of housing 10.

Figure 4:
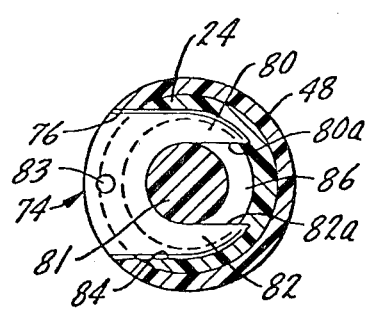
FIG. 4 is a section along plane 4—4 of FIG. 1, with the housing omitted.

The valve structure consisting of the stem, sleeve and seal support is held together by means of a thrust key 74. Seal support 48 has a slot 76 to receive the thrust key. Thrust key 74 has inwardly-extending spaced portions 80 and 82 which pass through a slot 84 in the sleeve and into a mating groove 86 in the stem, thus holding the stem and the sleeve together. Portions 80 and 82 are positioned on opposite sides of stem central portion 81. Note particularly FIG. 4. The facing edges 80a and 82a of thrust key portions 80 and 82 are slightly divergent to facilitate movement of the thrust key through the described slots and openings into the locking position of FIG. 4. Small recesses 77 and 79 are positioned in the seal support and sleeve directly adjacent the thrust key to permit access to a small hole 83 in the top of the thrust key to provide for its removal. Removal of the thrust key permits disassembly of the valve to renew the seal members.

The upper end of stem 20 has three flat sides, each of which is indicated at 87. Sleeve 24 has an upwardly-extending projection 88 which functions as a stop to limit rotation of the stem. A handle positioned on the flattened sides 87 of the stem can only be oriented in one position on the stem. Once so positioned a handle can only be moved a limited amount and in certain directions from the open and closed positions to thus insure that the valve can only be opened in one way and closed only be movement in the opposite direction.

The interior surface of seal support 48 has a portion 51 of slightly enlarged interior diameter so that the seal support may be assembled over the sleeve and seal member 44. The seal support is at least partially positioned over the sleeve prior to the time that the seal support beings to compress the seal. The seal is thus captured before any pressure is exerted upon it. There are mating shoulders 20a and 24a on the stem and sleeve, respectively, particularly shown in FIG. 1. The mating shoulders are slightly above the area of the thrust key. This particular construction is advantageous when the stem is assembled within the sleeve. First, it enables O-ring 56 to easily move with the stem when the stem is inserted from the bottom into the sleeve. Second, the cooperating shoulders will prevent the stem from being blown out of the sleeve in the event that the thrust key had not been properly inserted. In addition, the shoulders provide a locating means for positioning the stem relative to the sleeve for subsequent easy insertion of the key.

The valve closed position is illustrated in FIG. 1. Stem discharge port 36 is in register with seal ring 44 which forms the valve closing seal. As the stem is rotated counterclockwise away from the valve closed position, stem discharge port 36 will first be in communication with slot 40 of sleeve discharge port means 38, permitting a small amount of water to be discharged through the valve. Continued rotation in the same direction will ultimately place sleeve discharge port 42 in register with stem discharge port 36, thus providing full discharge of water through the valve. Water passing outwardly through port 42 will pass through openings 50 and 52 in the seal support and then outwardly through housing discharge port 30.

Of particular advantage in the construction described is the fact that seal 44 does not move with the stem, but rather is fixed in position. Thus, the seal is not rubbed or chafed or worn during valve operation. The seal is not in the line or path of water flow and thus is not subject to being moved by water pressure nor does it come in contact with foreign matter in the water supply. The seal provides a positive closure for the valve, but does so in such a manner as to insure that the seal is not worn and has a long life.

The thrust key not only holds the seal support and sleeve together, but holds the stem within the sleeve, preventing the stem from reciprocating and also preventing pressure from blowing the stem out. Similarly, the thrust key prevents someone from pushing the stem inwardly in such a manner that it would be impossible to thereafter operate the valve.

Figure 7:
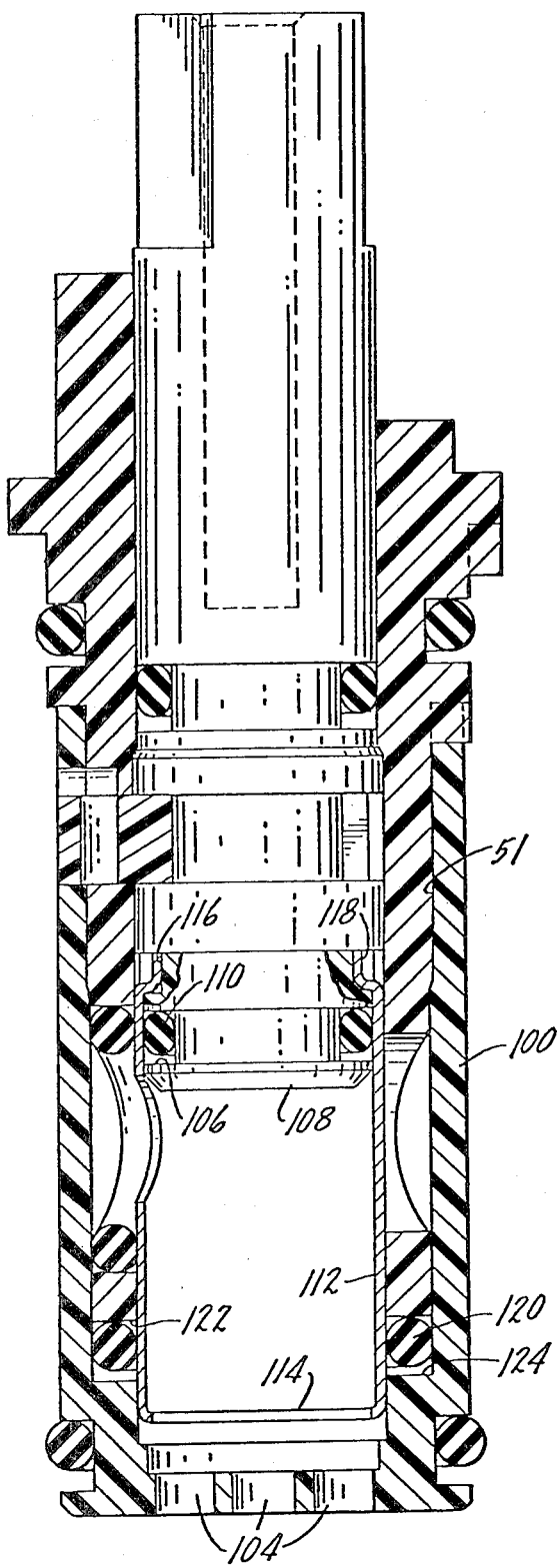
FIG. 7 is a enlarged vertical section, similar to FIG. 1, but showing a modified form of valve construction.
Figure 8:
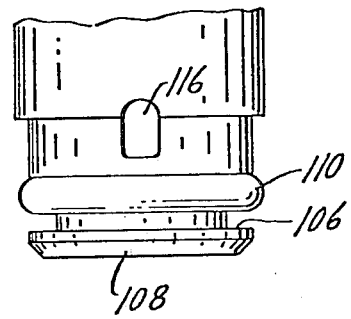
FIG. 8 is a partial side view of the valve stem of FIG. 7.
Figure 9:
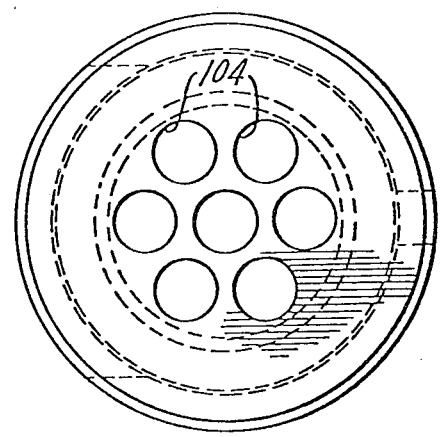
FIG. 9 is a bottom view of the seal support of the valve of FIG. 7.

FIGS. 7, 8 and 9 show a modified form of valve structure. The bottom of the stem is shown in FIG. 8 and includes an annular groove 106 slightly spaced from the lower end 108 of the stem. A seal ring 110 is positioned within groove 106 and provides a seal between the lower end of the stem and metallic, for example stainless steel, piston 112. Piston 112 has a lower open end 114 in register with seal support openings 104 to pass water into the interior of the piston. The piston itself is attached to the lower end of the stem through notches 116 formed in the stem directly above seal ring 110 and crimped portions 118 of the piston which are deformed into the notches. An O-ring 120 is positioned between the bottom 122 of the sleeve and a shoulder 124 on seal support 100.

The operation of the FIG. 7, 8 and 9 structure is the same as that described above. The stainless steel piston or cap provides a hard surface movable against the sealing O-ring carried by the sleeve and seal support. In the FIG. 1-16 structure the stem was made entirely of plastic. At times small particles can become embedded in plastic and as the plastic stem moves against the seal, such particles can grind or cut the seal eventually to the point where the valve will leak. A metallic or stainless steel cap or piston eliminates such potential wear and does not in any way abrade the seal as the stem moves back and forth between open and closed positions.

Figure 10:
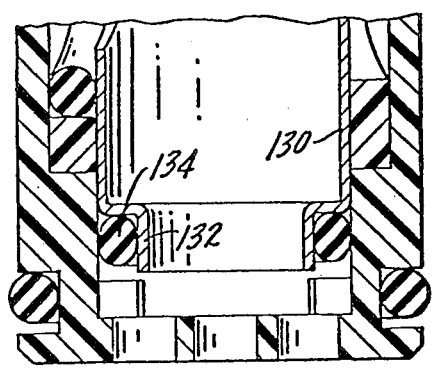
FIG. 10 is a partial vertical section similar to FIG. 7 and showing a modified embodiment.

The construction of FIG. 10 is identical to that of FIGS. 7-9, except for the shape of the inlet end of the stainless steel piston. Piston 130 may have a portion of reduced diameter, indicated at 132, which defines the stem inlet. A seal ring 134 is positioned in the recess formed by the portion of reduced diameter and functions in the same manner as seal ring 120 of the FIG. 7-9 construction. The reduced diameter piston or stem portion is advantageous in that it provides a seal ring or less diameter than the FIG. 7-9 construction; thus, to some degree, reducing the amount of friction restricting stem movement. Although the inlet is in fact smaller than in the other forms of the invention, this is not in any way a restriction on satisfactory operation of the valve.

Figure 11:
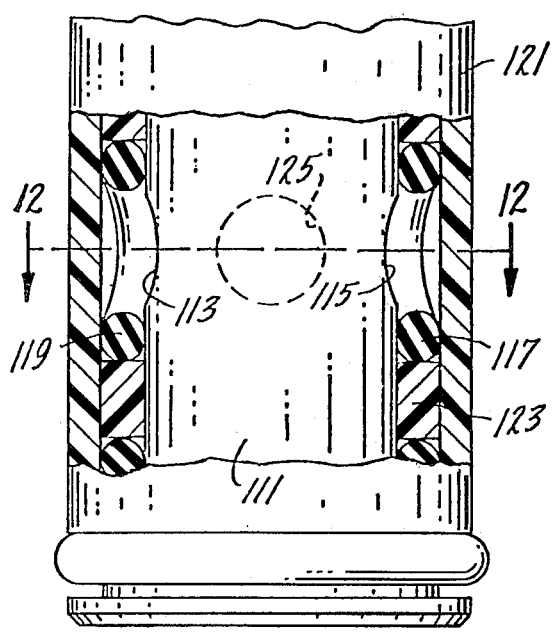
FIG. 11 is a partial vertical section of a further embodiment.
Figure 12:
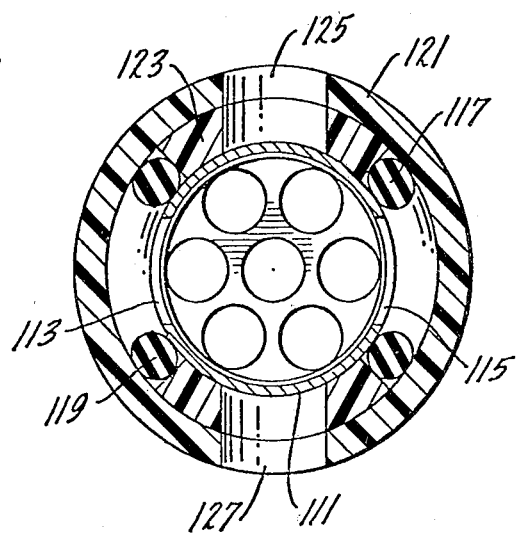
FIG. 12 is a section along plane 12—12 of FIG. 11.

The construction of FIGS. 11 and 12 is similar to that of FIGS. 7-9, except for the use of two closing seal rings at diammetrically opposed positions about the stem. The stem 111, which will have a stainless steel cap or piston, has a pair of diametrically opposed discharge ports 113 and 115, particularly illustrated in FIG. 12. There are two closing seal rings indicated at 117 and 119 which are held in position by a seal support 121. The seal support and sleeve 123 have aligned diammetrically opposed discharge ports 125 and 127 which are positioned between or intermediate the closing seal rings 117 and 119. Thus, the stem need only be rotated through an arc of less than about 45 degrees before one of the stem discharge ports will be at least partially in register with one of the sleeve and seal support discharge ports. In this connection, in some applications there may be only one sleeve and seal support discharge ports, although two have been shown herein.

The advantage of the FIG. 11-12 construction is that there is no cross pressure on the stem as would be the case in the constructions of FIGS. 1-10. Such cross pressure can, after the valve has been in use for a long period, cause excessive wear and leakage. It should be understood that the double closing seal ring construction of FIGS. 11 and 12 may be applicable to the valve of FIGS. 1-6, as well as to a valve having a stem with a stainless steel or steel piston.

Of advantage in the FIG. 7-9 and FIG. 11-12 constructions is that seal ring 120 is identical in size and shape to the closing seal ring positioned on the side of the stem. Seal ring 120 will normally receive wear about its interior surface as the stem moves relative to it. The closing seal ring, however, will only receive wear on the surface facing the stem or upon a surface which is 90 degrees to the surface of ring 120 which will receive wear during normal operation. By having seal rings of the same size and shape, and thus interchangeable, it is possible to interchange the seal rings after wear and effectively provide new seal rings as far as valve operation is concerned. To this extent the valve may be considered as carrying its own replacement parts.

Yet a further embodiment of the invention is shown in FIGS. 13-16. The thrust key and stem are identical with those previously described. There are certain modifications to the sleeve and the seal retainer. A diagonally disposed seal ring 140 replaces seal ring 44 of the previously-described construction. Seal ring 140 is positioned by a diagonal surface 142 formed at the lower end of sleeve 144 and a similarly disposed surface 146 formed at or along the upper end of a spacer member 148. Surfaces 156 and 142 form a diagonal slot or a slot formed diagonally with respect to the axis of movement of the stem within the sleeve.

Figure 13:
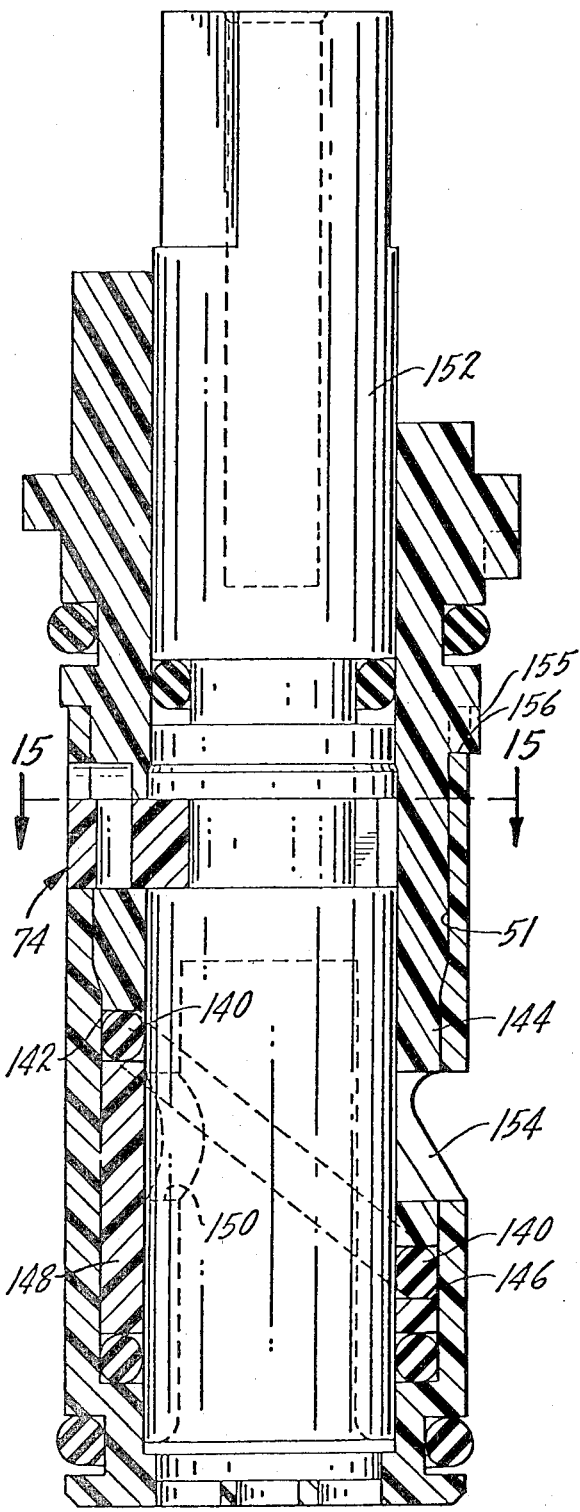
FIG. 13 is an enlarged vertical section showing yet a further form of valve construction.
Figure 14:
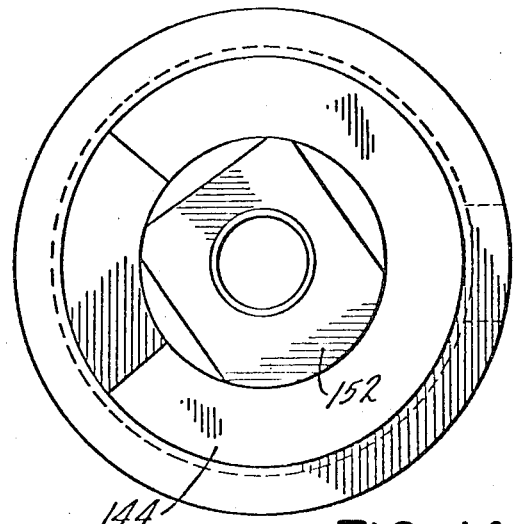
FIG. 14 is a top view of the structure of FIG. 13.
Figure 15:
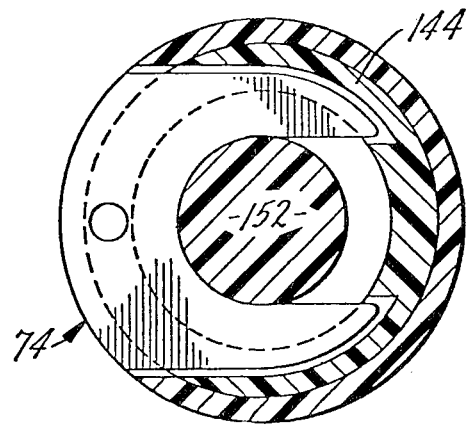
FIG. 15 is a section along plane 15—15 of FIG. 13.
Figure 16:
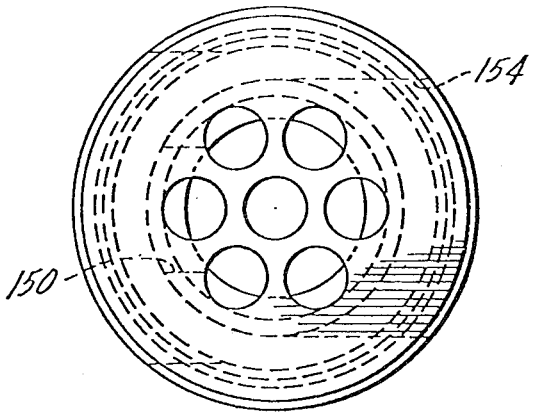
FIG. 16 is a bottom view of the valve of FIG. 13.

FIG. 13 shows the closed position of the valve and it will be noted that discharge port 150 of stem 152 is so disposed relative to closing seal ring 140 and seal retainer discharge 154 as to preclude any passage of water outwardly of the valve. As the stem is rotated, initially portions of port 150 will pass to the outlet side of seal ring 140, thereby permitting water to pass from port 150 to seal retainer discharge port 154. Water modulation is provided in this form of the invention in that as the stem is rotated, initially only portions of the stem discharge port 150 will be on the discharge side of the seal. Continued rotation of the stem will enlarge the portion of the discharge port which is on the discharge side, or on the side having access to seal retainer discharge port 154.

The construction of FIGS. 13-16, as well as the constructions in FIGS. 7-12, all have the mating shoulders on the stem and sleeve preventing stem blowout and providing the described locating functions. In addition, the chamfered portion or portion of enlarged diameter 51 on the seal retainer is utilized in FIGS. 1-16.

In assembly of a valve of the type described, it is necessary that the various members be properly aligned prior to insertion of the thrust key. For this purpose sleeve 144 has an alignment projection 155 which extends into a mating alignment groove 156 on the upper end of the seal retainer. Thus, when the seal retainer is assembled over the stem and sleeve, the mating projection and groove as described will insure proper alignment for insertion of the thrust key. Thus, there can be no misalignment of the closing seal ring 140 relative to the stem and seal retainer discharge ports.

Figure 17:
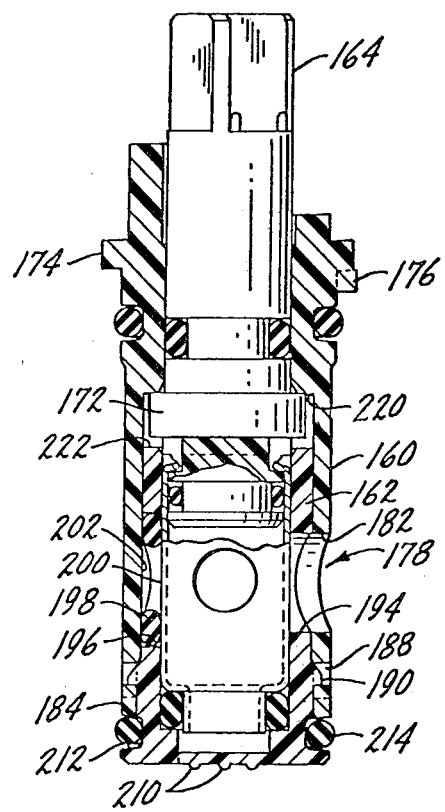
FIG. 17 is a partial vertical section showing a further form of valve construction.
Figure 18:
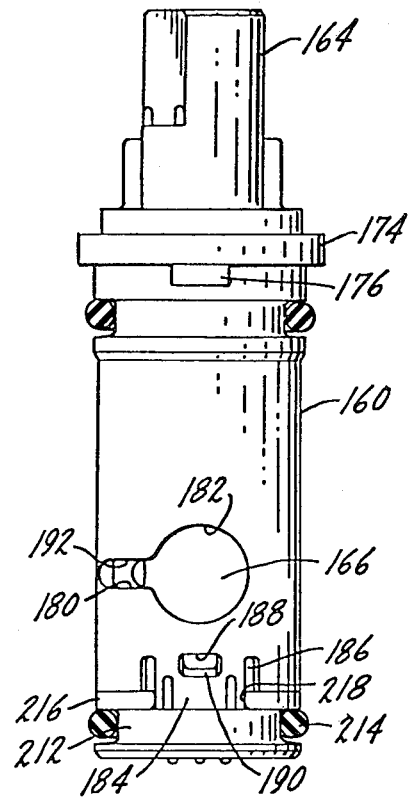
FIG. 18 is a side view of the valve of FIG. 17.
Figure 19:
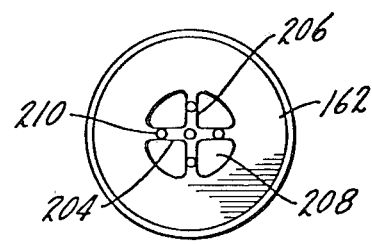
FIG. 19 is a bottom view of the seal support of FIGS. 17 and 18.

The construction of FIGS. 17, 18 and 19 includes a sleeve structure or sleeve means formed by a generally cylindrical sleeve 160, an internally positioned seal support 162 and a stem 164. The stem is substantially the same as shown in FIGS. 7 and 10 in that it includes a steel piston 166 having a reduced end portion 168 which positions a seal ring 170 providing a seal between the piston and the seal support. The principal difference between the stem of FIGS. 7 and 10 and stem 164 is the provision of an intermediately positioned outwardly extending annular boss 172 which is used to prevent relative reciprocal or axial movement between the stem and the sleeve structure.

Sleeve 160 has the same collar and projection locating arrangement, indicated at 174 and 176, respectively, as were present in the other forms of the invention. Sleeve outlet port means is indicated at 178 and includes a circumferentially extending slot 180 and a generally circular discharge port 182, similar to that shown in the other constructions. The lower end of sleeve 160 includes a pair of diammetrically disposed downwardly extending latching areas 184 separated from adjoining portions of the sleeve by small notches 186. Latching openings 188 are positioned slightly away from the terminal end of the latching areas 184 and will interlock with projections 190 extending outwardly from seal support 162, as particularly shown in FIG. 17.

Seal support 162, generally cylindrical in configuration, has discharge port means which include a circumferentially extending slot 192 and a generally circular discharge port 194, both of which are in alignment with slot 180 and port 182 of sleeve 160, thus providing registering discharge ports in the two elements forming the sleeve structure or sleeve means. Seal support 162 has a circular opening 196 which positions a seal ring 198, which functions in the same manner as seal ring 44 in the FIG. 1 construction and as similar seal rings in the other forms of the invention described herein. Seal ring 198 is supported by surface 200 of piston 166 and surface 202 of sleeve 160. The interior surface of the sleeve, the exterior surface of the piston and the radially extending annular surface 196 of the seal support combine to hold the seal ring 198 in position.

The lower end of seal support 162 has cross ribs 204 and 206 which together create and define water openings 208 which provide the inlet for water to pass into the valve structure. A plurality of small projections 210 may extend outwardly from ribs 204 and 206 for use in preventing a flat object from closing the valve inlet.

Directly adjacent the end of seal support 162 is a notch 212 mounting a seal ring 214. Adjacent notch 212 and forming one side of it is a discontinuous collar 216 having spaced openings 218 which receive the latching areas 184 of sleeve 160.

Sleeve 160 has an internal shoulder 220 which cooperates with end surface 222 of seal support 162 to form the opposing and limiting surfaces for boss 172 of stem 164, thereby positioning the stem within the sleeve structure and preventing reciprocal movement of the stem relative to the sleeve.

The construction of FIGS. 17-19 is reliable, but yet relatively simple in assembly. The stem is positioned within the seal support and then the combination of these two elements is positioned within the sleeve with the exterior end of the stem passing into the lower open end of sleeve 160. The valve operates in the same manner as the other constructions described herein.

The valve of FIGS. 17-19 differs from the previously-described valves, primarily in a reversal of the relative positions of the sleeve and seal support. The thrust key has been replaced by cooperating latching means on the seal support and sleeve. In addition, the seal support and sleeve have surfaces which cooperate to prevent axial movement of the stem.

The structure shown in FIGS. 20 and 21 is substantially similar to other forms of the invention except for the particular construction of the seal. In this case the seal closely resembles that shown in my prior U.S. Pat. No. 3,840,048. A generally cylindrical housing 230 has an outwardly-extending cylindrical portion 232 which defines the valve structure outlet. A portion of the housing, indicated at 234, may be exteriorly threaded to receive a cap which is used to hold the to be described valve structure within the housing. The lower end of the housing may have a downwardly-extending passage 236 which will serve as the inlet means for the valve.

Positioned within housing 230 is a valve structure which includes a stem indicated generally at 238 and a sleeve structure indicated generally at 240. The stem includes an outer section 242 which will be used to attach a suitable operating means. There is a shoulder 244 positioned on one side of and holding in place an O-ring 246. A somewhat larger shoulder 248 is positioned on the opposite side of O-ring 246. The remaining portions of the stem may be substantially similar to those shown in FIGS. 17, 18 and 19 as well as other forms of the invention. There is a stem discharge or outlet port 250 particularly shown in FIG. 20. The bottom end of stem 238 may have a suitable inlet indicated generally at 252. Thus, the path of water flow through the stem will be from inlet 252 into the generally hollow interior of the stem, out outlet port 250 and then to the housing discharge 232, assuming the stem has been rotated from the closed position of FIG. 20 to an open position.

The sleeve structure includes a generally cylindrical sleeve member 254 which is positioned within the housing and a cap-like structure 256 which is positioned with an outwardly-extending shoulder 258 overlying the outer end of housing 230. The sleeve member and the cap may be suitably held together to provide a unitary structure, for example by projections 260 on the sleeve member which fit within mating notches 262 on the cap. In any event, what is important is to provide a unitary sleeve structure which can be simply positioned and attached to the housing and which will permit rotation of the interior stem but not reciprocation.

There is a groove 264 formed on the interior of cap 256 which groove will position shoulder 248 on the stem to thus prevent reciprocation of the stem relative to the sleeve. The sleeve structure has a pair of spaced exteriorly-facing grooves which will contain or mount seal rings 266 and 268 to effectively seal opposite ends of the sleeve structure to the interior of the housing. The sleeve structure may include an outlet port 267 positioned in alignment with housing discharge 232.

The fixed seal member which provides the above-described valve closure or valve shutoff, as indicated above, is similar to the seal shown in my prior patent. The seal includes a body portion 270 and a port seal portion 272 which extends through an opening 274 in the sleeve structure. The body portion, in plan view, will be somewhat rectangular in shape, but it will have a cylindrical curve to conform to the exterior of the sleeve. In fact, the body portion will fit within a cylindrical recess 276 formed on the exterior of the sleeve and there may be an in-turned peripheral seal flange 278 which will fit within a mating notch 280 to thus hold the seal member onto the exterior of the sleeve. There are a plurality of beads 282 which extend about the periphery of the body member and are in contact with the interior or housing 230. The beads define the outer boundary of a pressure chamber formed by a recess or depression 284 in the seal body portion. As described in the above-mentioned patent, water will pass into the seal structure from stem outlet port 250 to fill depression or recess 284 and create an inwardly-directed water pressure-created force upon the port seal portion 272 of the sleeve, thus urging the port seal portion into sealing contact with the stem.

The fixed seal member which provides valve closure functions in the FIG. 20 and 21 structure as in the other forms of the invention. Of principal advantage is the fact that the seal is out of the path of flow defined from the sleeve inlet to the stem inlet and then from the hollow stem interior through the stem outlet to the sleeve outlet. At no time is there any fluid of water flow through the center of the seal structure. Water will be in contact with the seal, but there will never be any pressure upon the seal of the type that could cause it to be removed from its fixed position. Nor is there any pressure upon the seal which will cause it to exclude outwardly from its groove or form its retained position on the sleeve to the point that the moving stem would cut or abrade the seal. In the case of the FIG. 20 and 21 structure, it is particularly advantageous to utilize the water pressure itself to create a firm seal closure upon the stem.

Whereas the preferred form of the invention has been shown and described herein, it should be realized that there may be many modifications, substitutions and alterations thereto.

The embodiments of the invention in which an exclusive property or privilege is claimed are defined as follows:

1. Fluid valve means including sleeve means, inlet and outlet port means in said sleeve means, a stem movable within said sleeve means between open and closed positions and having inlet and outlet port means, said stem inlet port means being in communication with said sleeve means inlet port means, said stem outlet port means being movable into register with said sleeve means outlet port means to thereby define a path of flow through said valve means from said communicating stem and sleeve means inlet port means through said stem outlet port means and said sleeve means outlet port means, and a fixed seal member carried by said sleeve means and for closing flow between said said sleeve means inlet and outlet port means, said seal member being annular, at least in part, with the annulus being arranged about an axis perpendicular to the axis of said stem, said seal member being spaced from said sleeve means outlet port means with said path of flow through said valve means never being through said seal member at any position of said stem to thereby protect said seal member from movement and wear caused by dynamic water pressure and foreign matter within the water, said stem outlet port means being in register with and closed by said seal member when said stem is in a closed position.

2. The structure of claim 1 further characterized in that said sleeve means includes a seal support and a sleeve with said seal support being positioned within said sleeve.

3. The structure of claim 2 further characterized in that said seal member is positioned by adjoining surfaces of said sleeve and seal support.

4. The structure of claim 3 further characterized in that said adjoining surfaces are mutually perpendicular.

5. The structure of claim 2 further characterized in that said seal member is carried by said seal support and is in contact with an interior surface of said sleeve.

6. The structure of claim 1 further characterized in that said stem includes a hollow piston attached to one end thereof, with said stem inlet and outlet port means being formed by said piston.

7. The structure of claim 6 further characterized in that said stem is formed of a plastic material, with said piston being metallic.

8. The structure of claim 1 further characterized in that said sleeve means includes a seal support and a sleeve with said seal support being positioned about said sleeve and having an inner surface supporting said seal member.

9. The structure of claim 1 further characterized in that said stem is rotatable within said sleeve means, with said stem outlet port means being rotatably movable toward and away from said seal member.

10. The structure of claim 9 further characterized by and including means preventing relative axial movement between said stem and sleeve.

11. The structure of claim 10 further characterized in that said means preventing relative movement includes a thrust key extending at least in part through said sleeve and into engagement with said stem.

12. The structure of claim 11 further characterized in that said thrust key is used to attach said seal support to said sleeve.

13. The structure of claim 1 further characterized in that said sleeve means and stem inlet port means are coaxially arranged at adjacent ends thereof.

14. The structure of claim 1 further characterized in that said stem has an interior chamber, said stem inlet and outlet port means opening into said chamber with said stem outlet port means being arranged for discharge radially outwardly through said stem.

15. The structure of claim 1 further characterized in that said stem includes a hollow piston attached to one end thereof, said stem inlet and outlet port means being formed by said piston.

16. The structure of claim 15 further characterized in that said stem and sleeve are formed of a plastic material, with said piston being metallic.

17. The structure of claim 16 further characterized in that said metallic piston has a portion of reduced diameter at one end thereof.

18. The structure of claim 16 further characterized by and including seal means between the inlet end of said metallic piston and an interior surface of said sleeve means.

19. The structure of claim 15 further characterized by and including a seal ring extending about said hollow piston and in sealing contact with said sleeve means, said last-named seal ring being of a size and shape the same as that of said closing seal member and having a sealing surface different than that of said closing seal member whereby an interchange of said seal ring and seal member provides renewed sealing surfaces.

20. The structure of claim 1 further characterized in that said sleeve means outlet port means circumferentially increases in size in the direction of rotation of said stem from the closed toward the open position.

21. The structure of claim 20 further characterized in that said sleeve means outlet port means includes a notch and an adjacent communicating port.

22. The structure of claim 1 further characterized by and including a second fixed seal member carried by said sleeve means, and a second stem outlet port movable into register with said sleeve means outlet port means.

23. The structure of claim 22 further characterized in that said fixed seal members are positioned at diammetrically opposed points on said sleeve means and are arranged about an axis perpendicular to the axis of said stem.

24. The structure of claim 23 further characterized in that said sleeve means outlet port means is positioned intermediate said fixed seal members.

25. The structure of claim 22 further characterized in that said sleeve means includes a seal support and a sleeve with said seal support being positioned about said sleeve and having an inner surface supporting said fixed seal members.

26. The structure of claim 1 further characterized in that said seal member includes a body portion and an annular portion integral therewith, with said annular portion being in sealing contact with said stem.

27. The structure of claim 26 further characterized in that said seal member body portion is positioned upon the exterior of said sleeve means, with said annular portion extending through said sleeve means and into contact with said stem.

28. The structure of claim 27 further characterized by and including a depression in said seal member body portion extending about said annular portion functioning as a pressure chamber for providing a pressure-created force upon said annular portion to urge it into sealing contact with said stem.

29. The structure of claim 26 further characterized by and including interlock means on said body portion and sleeve means for attaching said seal member to said sleeve means.

* * * * *